United States Patent
Payen et al.

(10) Patent No.: US 6,823,772 B2
(45) Date of Patent: Nov. 30, 2004

(54) FOOD COOKING APPLIANCE WITH COOLING FLOW

(75) Inventors: Jean-Marc Payen, Quetigny (FR); Bernard Bouly, Dijon (FR)

(73) Assignee: SEB S.A. (FR)

( * ) Notice: Subject to any disclaimer, the term of this patent is extended or adjusted under 35 U.S.C. 154(b) by 0 days.

(21) Appl. No.: 10/239,908
(22) PCT Filed: Jan. 29, 2002
(86) PCT No.: PCT/FR02/00338
§ 371 (c)(1), (2), (4) Date: Jan. 13, 2003
(87) PCT Pub. No.: WO02/062187
PCT Pub. Date: Aug. 15, 2002

(65) Prior Publication Data
US 2004/0007138 A1 Jan. 15, 2004

(30) Foreign Application Priority Data
Feb. 2, 2001 (FR) .............................................. 01 01549

(51) Int. Cl.⁷ .............................. A23L 1/00; A47J 27/00; A47J 37/00
(52) U.S. Cl. ............................ 99/330; 99/337; 99/403; 99/470; 126/389.1; 55/467.1; 55/DIG. 36

(58) Field of Search .................. 99/330, 331, 403–410, 99/444–450, 483, 337, 411–418, 485, 470; 219/492, 494, 497, 452, 506, 448, 401; 220/592, 912, 314, 316; 126/299 E, 389.1, 299 D, 299 R; 55/DIG. 36, 446, 467, 385.1, 467.1, 385.4; 312/31.1

(56) References Cited

U.S. PATENT DOCUMENTS

| | | | | |
|---|---|---|---|---|
| 5,355,777 A | * | 10/1994 | Chen et al. ................... | 99/340 |
| 5,839,357 A | * | 11/1998 | Ha et al. ........................ | 99/337 |
| 5,924,414 A | * | 7/1999 | Schallig et al. ............... | 99/403 |
| 6,283,015 B1 | * | 9/2001 | Kwon et al. ................... | 99/337 |
| 6,499,390 B1 | * | 12/2002 | Huang .......................... | 99/331 |

* cited by examiner

Primary Examiner—Timothy F. Simone
(74) Attorney, Agent, or Firm—James W. Kayden; Thomas, Kayden, Horstemeyer & Risley, LLP

(57) ABSTRACT

A food-cooking appliance having a cooking bowl designed to be closed by a lid (7) in a substantially airtight manner during cooking, heater means, and odor treatment means (10) for treating the cooking odors, which means discharge the treated stream of air to the outside of the appliance via at least one opening (20), the food-cooking appliance being characterized in that it includes cooling means (21) designed to generate a cooling stream directed to sweep across the opening (20).

19 Claims, 2 Drawing Sheets

FOOD COOKING APPLIANCE WITH COOLING FLOW

TECHNICAL FIELD

The present invention relates to the general technical field of appliances for heating or cooking food, which appliances are equipped with means for treating cooking odors, such means discharging a stream of hot air to the outside of the appliance.

The present invention relates to a food-cooking appliance comprising a cooking bowl designed to be closed by a lid in substantially airtight manner during cooking, heater means, and odor treatment means for treating cooking odors, which means discharge the treated stream of air to the outside of the appliance via an opening.

PRIOR ART

When cooking food, be it when steaming in rice cookers, for example, or when frying in oil in deep flyers, it is already known that, in order to avoid giving off cooking odors that are generally unpleasant into the immediate surroundings of the appliance, it is possible to make a cooking appliance with a lid suitable for closing the appliance in substantially airtight manner during cooking. However, for obvious safety reasons, it is always necessary to provide a leakage path via which the stream of air from the cooking can escape, and that is why it is known that such food-cooking appliances for household use can be equipped with cooking odor treatment means serving to treat the stream of air from the cooking in order to remove from that stream all or some of the volatile molecules responsible for cooking odor.

Various devices have been considered, and in particular the use of activated charcoal filters that make it possible to retain all or some of the fats, as described, for example, in Patent Document FR-1 568 985 or in Patent Document EP-150 516.

In all cases, such known devices always imply discharging from the deep fryer a stream of air at a temperature that is high and that varies depending on the type of the food-cooking appliance in question, and on the type of odor treatment used. Discharging such a stream of vapor, at such a temperature that varies, e.g. approximately in the range 100° C. to 250° C., naturally gives rise to a problem of safety for the user who might be scalded.

It has been proposed to try to direct the stream of hot air into zones that are not directly accessible to the hands of the user. However, it has become apparent that seeking to provide preferred exhaust paths complicates designing such food-cooking appliances of the rice cooker or deep fryer type, and is usually accompanied by a problem of poor high temperature behavior of the parts (generally made of plastic) that are situated in the vicinity of the outlet via which the stream of vapor exits.

SUMMARY OF THE INVENTION

An object assigned to the invention is therefore to remedy the various above-mentioned drawbacks of the prior art, and to provide a novel food-cooking appliance that makes it possible to discharge a stream of hot air to the outside of the appliance while being entirely safe for the user, and while being particularly simple and inexpensive to design and make.

Another object of the invention is to provide a novel cooking appliance that makes it possible to reduce the temperature of the stream of hot air to the outside of the appliance effectively and at lower cost.

Another object of the invention is to provide a novel cooking appliance that reduces the extent to which the vapors are perceived in the immediate surroundings of the cooking appliance.

Another object of the invention is to provide a novel cooking appliance that remains attractive in appearance and generally ergonomic.

Another object of the invention is to provide a novel cooking appliance that makes it entirely safe to use odor treatment means that discharge a stream of air at high temperature.

An additional object of the invention is to provide a novel cooking appliance that is considerably safer to use.

Another object of the invention is to provide a novel cooking appliance that enables the members of the appliance that are sensitive to temperature to be cooled effectively.

Another object of the invention is to provide a novel cooking appliance that is well suited to incorporating odor treatment means operating at high temperature, such as a catalytic device.

The objects assigned to the invention are achieved by means of a food-cooking appliance comprising a cooking bowl designed to be closed by a lid in substantially airtight manner during cooking, heater means, and odor treatment means for treating cooking odors, which means discharge a treated stream of air to the outside of the appliance via at least one opening, said food-cooking appliance being characterized in that it includes cooling means designed to generate a cooling stream directed to sweep across the opening.

BRIEF DESCRIPTION OF THE DRAWINGS

The objects and advantages of the invention appear more clearly on reading the following description given with reference to the accompanying drawings which are given merely by way of non-limiting and illustrative examples, and in which.

BEST MANNER OF IMPLEMENTING THE INVENTION

Figure 1:
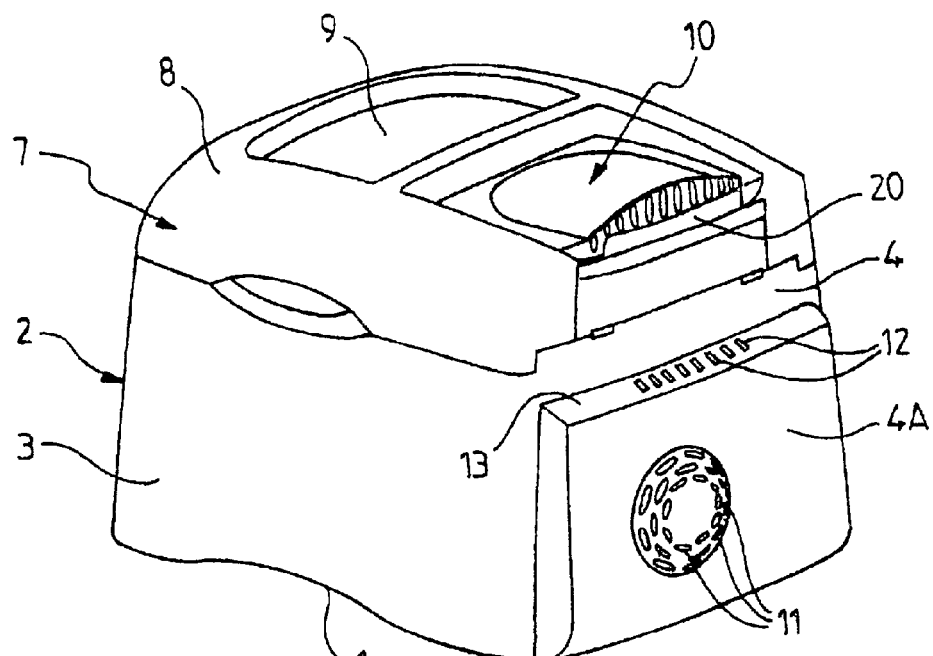
FIG. 1 is an overall perspective view of a food-cooking appliance of the invention.
Figure 2:
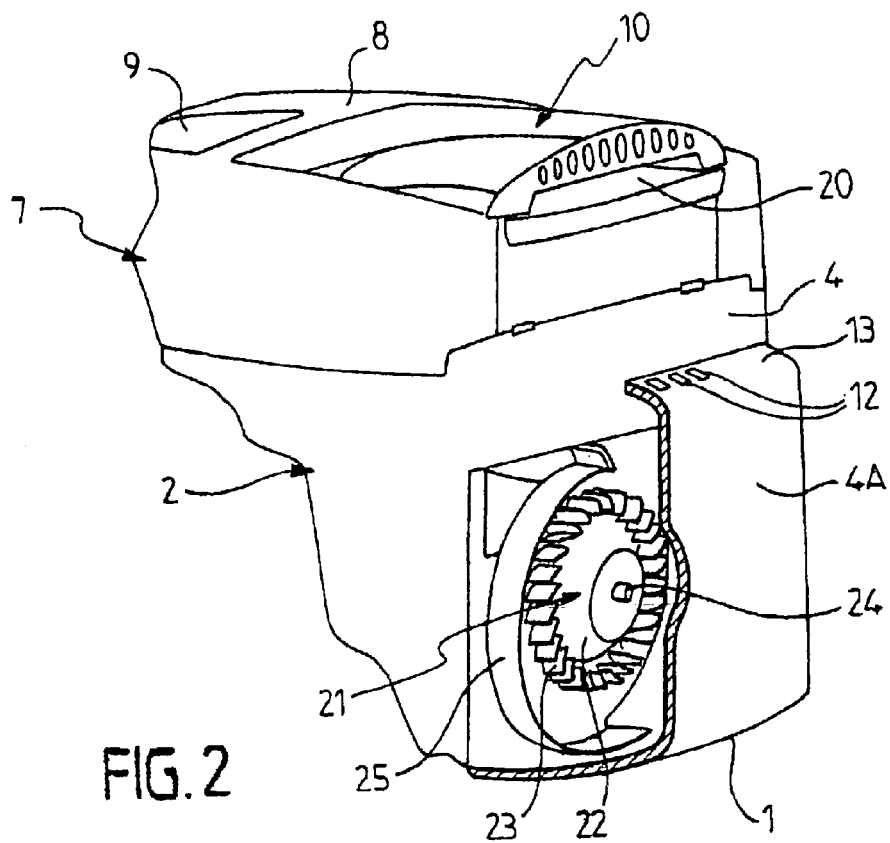
FIG. 2 is a fragmentary perspective and cutaway view showing an embodiment detail of the fan means for ventilating the food-cooking appliance of the invention.

In the embodiments shown in FIGS. 1 and 2, the food-cooking appliance of the invention described is constituted by a deep fryer designed to deep fry food of all types in fat, such as an oil bath, for example. In the meaning of the invention, it should however be understood that the term "food-cooking appliance" covers all household food-cooking appliances that are suitable for cooking food, the use of the invention in deep-frying appliances of the deep fryer type merely being a preferred use, and the invention is naturally also applicable to other uses such as pressure cookers, rice cookers, or multi-purpose cookers, provided that such cooking appliances cook in a substantially airtight enclosure and discharge a stream of hot air.

Figure 3:
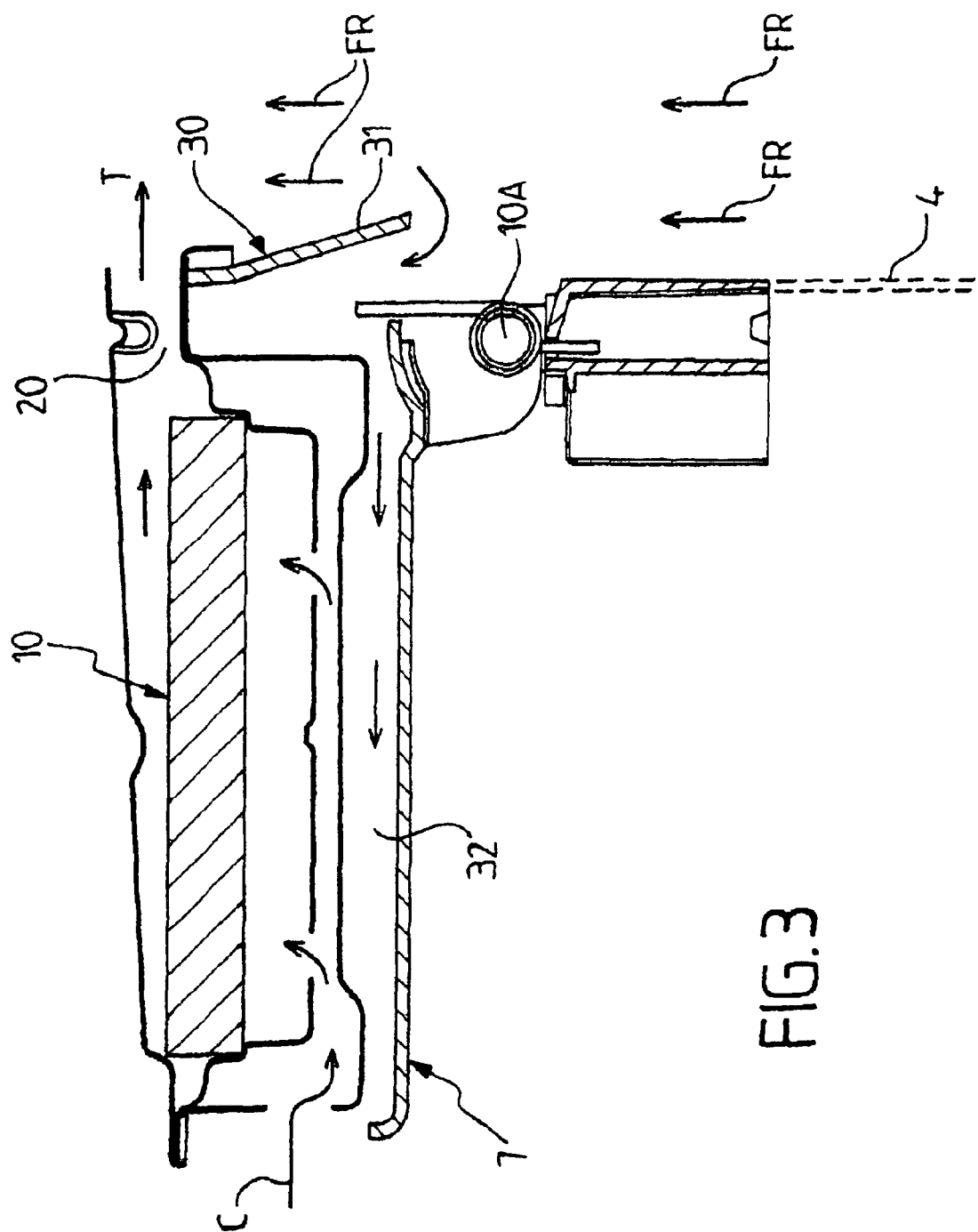
FIG. 3 is a fragmentary section view showing an embodiment detail of the deflector means of the cooking appliance of the invention.

The food-cooking appliance shown in FIGS. 1 and 3, which is an electric deep fryer in this example, has a base 1 forming the stand on which the appliance is designed to stand on a surface or on a support. The base 1 is generally integral with an outer skirt 2 or mounted on said skirt, which is made, for example, of a metal material or of a plastics material that withstands high temperatures, and which forms the outer casing of the deep fryer. In conventional manner, the outer skirt 2 is however made of a cheap plastics material that does not withstand high temperatures well, such as polypropylene, and that is not capable of withstanding the heat energy dissipated continuously by the high-temperature heater elements that are conventionally used in electric deep fryers and that are generally disposed at the bottom in the vicinity of the base 1.

The heater means of the appliance (not shown in the figures) may be conventionally made up of metal-clad elements or equivalent elements also connected in conventional manner to an electrical connection block (not shown) and to electrical wiring making it possible to connect the appliance to a source of electricity. The heater means may be incorporated into the appliance, i.e. they may be internal and fixed, e.g. permanently, to or under a bowl, or else they may be external, e.g. secured to or integral with a heater base or a burner that is separate or separable from the bowl or from the other members of the appliance. In a manner also known to the person skilled in the art, the cooking appliance of the invention is provided with all of the electrical and electronic safety devices such as temperature sensors, fuses, etc. that are required when designing such appliances. Since those elements are well known to the person skilled in the art, they are not described in greater detail in the description below.

The outer skirt 2 may be of any suitable and pleasing geometrical shape, e.g. circular, oval, or rectangular, so as to define side faces 3 and front and back faces 4, for example.

The top portion of the outer skirt 2 is advantageously provided with an annular ring forming the mechanical coupling between the top portion of the outer skirt 2 and a cooking bowl (not shown) that is generally made of metal, serving to receive the frying oil and the food to be fried. As is well known to the person skilled in the art, e.g. from Patent Document FR-87 06728, the annular ring is advantageously made of a thermally insulating material that continuously withstands the temperatures at which the deep fryer is used, e.g. polyamide, polyester, polybutylene terephthalate (PBTP) or the like, and said annular ring advantageously supports the cooking bowl, at least in part.

In the meaning of the invention, the base 1, the outer skirt 2, and the annular ring generally form the main body of the food-cooking appliance of the invention.

In the invention, the deep fryer has a removably-mounted lid 7 which is hinged to the main body of the deep fryer and which is designed to close said main body during cooking in substantially airtight manner, e.g. by means of sealing gaskets (not shown in the figures).

Advantageously, and as shown in FIGS. 1 and 2 in particular, the top face 8 of the lid 7 may be provided with an inspection window 9 making it possible to check the progress of cooking or of deep frying during a cooking cycle, and when the lid is closed on the main body.

Cooking food in closed surroundings, be it by steaming or by frying, generates characteristic and often unpleasant odors resulting from the chemical reactions related to the cooking proper, and in particular to the emission of volatile organic substances.

For this reason, the food-cooking appliance of the invention includes and is equipped with odor treatment means 10 for treating the cooking odors, which means are associated with the lid 7, it being understood, in the meaning of the invention, that the term "associated" is used to indicate that, when the lid 7 is in the closed position, the food is cooked in closed surroundings, and all of the streams C (FIG. 3) from the cooking pass through the odor treatment means 10 to be treated therein. In the meaning of the invention, associating the cooking odor treatment means 10 with the lid 7 covers mounting said means 10 on or in the lid 7, or on or in the main body of the appliance.

In a manner known per se, the cooking odor treatment means 10 are formed by any conventional treatment means known to the person skilled in the art, and, for example, by a charcoal filter or by a heat treatment device such as a catalytic device.

As shown in FIG. 3, the lid 7 is therefore advantageously mounted to pivot about a hinge by being mounted directly on the odor processing means 10 which incorporate and include the hinge 10A of said lid.

By way of variants, other types of mounting may be imagined, it being possible for the lid merely to be placed on the main body.

In the food-cooking appliance of the invention, the cooking odor treatment means 10 discharge the stream of treated air T coming from the streams C from the cooking of the food in the cooking bowl to the outside of the appliance via at least one opening 20. Depending on the method of cooking in question, and depending on the type of the cooking odor treatment means 10 used, the temperature of the treated air stream T discharged to the outside of the appliance can lie in the range 100° C. to 250° C., for example.

According to an important characteristic of the invention, the food-cooking appliance includes cooling means 21 disposed in the appliance to generate a cooling stream FR directed such as to sweep across the opening 20 with a sweep stream so as to cool the treated air stream T as it exits from said opening 20. The purpose of the cooling means 21 is thus to perform a general function of cooling the stream of treated air discharged from the appliance. It thus serves specifically and essentially to reduce the temperature of the discharged air stream.

Advantageously, the cooling means are formed by fan means 21 which are disposed in the appliance in a manner such as to suck in the cooling stream from outside the appliance so as to use a cooling air stream that is at ambient temperature and that has a temperature difference relative to the discharged treated air stream that is large enough to cool it effectively.

Thus, the majority or even all of the cooling stream is at a temperature lower than the discharged treated air stream T, and comes from outside the appliance, while optionally passing inside the appliance over a path that is short enough and far enough away from any heat source to perform its cooling function to the full.

As shown in FIGS. 1 to 3, the fan means 21 are particularly advantageously mounted vertically below the opening 20 so as to generate a cooling stream that is substantially vertical and tangential to most or even all of the cross-section of the opening 20, thereby advantageously forming a cooling stream FR that is directed perpendicularly to the treated air stream T discharged to the outside of the appliance. Thus, excellent mixing of the two streams is achieved, conducive to achieving a large reduction in temperature very close to the appliance. In addition, the two air streams cross each other advantageously at right angles, the resulting cooled stream having no preferred direction in three dimensions, thereby correspondingly reducing the risks of the user being situated in the field of a preferred air stream.

In a preferred configuration for mounting the fan means 21 on the appliance, and as shown in FIGS. 1 and 2, said fan means 21 are mounted behind an outer wall of the appliance, on the inside of the appliance, e.g. behind a separate back wall 4A mounted on the back wall 4. By way of a variant, the fan means 21 may be mounted behind an outer wall that is not separate but rather that is an integral part of the outer wall, e.g. of the back wall 4.

In the invention, the fan means 21 are mounted behind an outer wall 4A that is provided with suction orifices 11 advantageously distributed around concentric circles, for example, and suitable for generating a suction stream that is substantially normal to the plane in which the wall 4A extends, and with sweep orifices 12 suitable for generating the cooling stream normal to the suction stream.

As shown, the sweep orifices 12 are provided through a rim 13 for connecting to the back face 4 of the appliance so as to define a back compartment in which the fan means 21 are disposed. Advantageously, the fan means 21 comprise a turbine 22 provided with blades 23, said turbine being mounted to rotate about an axis 24 that is substantially perpendicular to the wall 4A and to the inlet axes of the suction orifices 11. The turbine 22 is surrounded by a directional volute 25 that is, for example, substantially circular and that, in conjunction with the inclination of the blades 23, makes it possible to suck in the suction stream in a direction substantially normal to the wall 4A, and then to turn said suction stream up through an angle of about 90° so as to force it to exit via the sweep orifices 12 so as to generate a cooling stream FR that is substantially vertical, parallel to the outer skirt 2, and directed from the bottom to the top of the deep fryer.

Advantageously, and as shown in FIG. 3, the cooling stream FR sucked in via the suction orifices 11 may also additionally be used to cool members of the cooking appliance that are sensitive to temperature, such as the back hinge of the lid, or the surroundings of the filter system including the odor treatment means 10. To this end, the fan means 21 are associated with deflector means 30 such as one or more deflectors 31 and/or branch channels 32 provided in the appliance, e.g. upstream from the suction orifices 11, so as to direct and to channel a fraction of the sucked-in cooling air stream towards the accessory members to be cooled.

As shown, the deflector 31 may be mounted vertically below the opening 20, while extending substantially radially outwards from the cover 7 so as to deflect a small and minority fraction of the cooling stream FR into the odor treatment means 10. The branch channel(s) 32 extending the deflector 31 is/are advantageously provided in the bottom portion of the odor treatment means 10 so as to cool said means and parts made of plastic in its immediate surroundings.

Preferably, the fan means 21 are implemented in the form of a motor-driven fan unit sucking in air substantially at the center of the turbine 22 and suitable for delivering a vertical jet of air along the skirt of the appliance at a flow rate of about 20 cubic meters ($m^3$) per hour, the generated jet of air having dimensions of about 10 millimeters (mm)×80 mm in register with the opening 20.

Since cooling of the treated air stream T is particularly effective, it is possible, in the cooking appliance of the invention, to install cooking odor treatment means 10 that are catalytic treatment means, generally implying that the air stream to be treated must be pre-heated by a heater system, for ensuring the treatment is effective. In which case, the temperature of the treated air stream discharged to the outside via the opening 20 can reach about 250° C. However, the effectiveness with which the opening 20 is swept makes it possible to reduce the temperature of the emitted treated air stream considerably and over a path of very short length.

Finally, for safety reasons, it is possible to consider having the fan means 21 connected functionally to heat safety means such as an electrical contact coupled to the cooking stream heater system associated with the catalytic treatment means and serving to heat said stream before it is treated in the catalytic treatment means. In which case, in the event of failure or malfunction of the motor-driven fan unit, the heat safety means automatically interrupt the electrical power supply to the heater system, thereby improving the safety of the appliance.

The use of fan means generating a cooling stream serving to sweep the outlet opening via which the air stream is discharged to the outside of the appliance makes it possible:

to make it safer to use the appliance by cooling the temperature of the discharged air stream;

to dilute the discharged air stream with cool air, thereby making it possible to reduce the visual perception of the discharged air stream; and to cool the parts supporting the odor treatment means 10 in particular, thereby making it possible to use plastics materials that cannot withstand the temperature generated by the vapors and by the anti-odor treatment, the cover then being particularly well ventilated and not overheating.

SUSCEPTIBILITY OF INDUSTRIAL APPLICATION

The industrial application of the invention lies in manufacturing and designing household food-cooking appliances, in particular deep fryers operating by immersing food in a cooking fluid and equipped with catalytic converters.

What is claimed is:

1. A food-cooking appliance comprising a cooking bowl designed to be closed by a lid (7) in substantially airtight manner during cooking, a heater means, and an odor treatment means (10) for treating the cooking odors, wherein the odor treatment means discharge the treated stream of air to the outside of the appliance via at least one opening (20), and wherein said food-cooking appliance includes cooling means (21) designed to generate a cooling stream directed to sweep across the opening (20).

2. The appliance according to claim 1, wherein the cooling means further comprise fan means (21) that suck in the cooling stream from outside the appliance.

3. The appliance according to claim 2, wherein the fan means (21) are mounted vertically below the opening (20) so as to generate a cooling stream that is substantially vertical.

4. The appliance according to claim 3, wherein the fan means (21) are mounted behind an outer wall (4, 4A) of the appliance, the outer wall being provided with a plurality of suction orifices (11) for generating a suction stream that is substantially normal to the wall (4, 4A), and with a plurality of sweep orifices (12) generating a cooling stream that is normal to the suction stream.

5. The appliance according to claim 4, wherein the fan means (21) further comprise a turbine (22) surrounded by a directional volute (25).

6. The appliance according to claim 5, wherein the fan means (21) are a motor-driven fan unit.

7. The appliance according to claim 1, wherein the odor treatment means (10) further comprise catalytic treatment means.

8. The appliance according to claim 7, wherein the fan means (21) are connected functionally to a thermal safety means coupled to a heater system for heating the cooling stream and that is associated with the catalytic treatment means.

9. The appliance according to claim 2, wherein the fan means (21) are associated with deflector means (30) disposed so as to cool accessory members of the appliance including a lid hinge and the cooking odor treatment means (10).

10. The appliance according to claim 1, wherein the appliance further comprises a deep fryer.

11. A food-cooking appliance comprising a cooking bowl designed to be closed by a lid (7) in a substantially airtight manner during cooking, a heater means, an odor treatment means (10) for treating the cooking odors, the odor treatment means being arranged and configured to discharge the treated stream of air to the outside of the appliance via at least one opening (20), and cooling means (21) designed to generate a cooling stream, the cooling means being arranged and configured such that the cooling stream is directed to substantially sweep across the opening (20).

12. The appliance according to claim 11, wherein the cooling means (21) are mounted vertically below the opening (20) so as to generate a cooling stream that is substantially vertical.

13. The appliance according to claim 12, wherein the cooling means (21) are mounted behind an outer wall (4, 4A) of the appliance, the outer wall being provided with a plurality of suction orifices (11) for generating a suction stream that is substantially normal to the wall (4, 4A), and with a plurality of sweep orifices (12) generating a cooling stream that is normal to the suction stream.

14. The appliance according to claim 12, wherein the cooling means (21) further comprise a turbine (22) surrounded by a directional volute (25).

15. The appliance according to claim 12, wherein the cooling means (21) are a motor-driven fan unit.

16. The appliance according to claim 12, wherein the odor treatment means (10) further comprise catalytic treatment means.

17. The appliance according to claim 12, wherein the cooling means (21) are connected functionally to a thermal safety means coupled to a heater system for heating the cooling stream and that is associated with the catalytic treatment means.

18. The appliance according to claim 12, wherein the cooling means (21) are associated with deflector means (30) disposed so as to cool accessory members of the appliance including a lid hinge and the cooking odor treatment means (10).

19. The appliance according to claim 12, wherein the appliance further comprises a deep fryer.

* * * * *